US012680974B2

(12) United States Patent \
Gebhardt et al.

(10) Patent No.: US 12,680,974 B2 \
(45) Date of Patent: Jul. 14, 2026

(54) COMPUTER IMPLEMENTED METHOD FOR PROVIDING TEMPERATURE DATA, A COMPUTER PRODUCT ELEMENT AND A SYSTEM

(71) Applicant: ABB Schweiz AG, Baden (CH)

(72) Inventors: Joerg Gebhardt, Mainz (DE); Guruprasad Sosale, Munich (DE); Subhashish Dasgupta, Bangalore (IN); Patric Ackermann, Fischbachtal (DE); Wilhelm Daake, Petershagen (DE); Karsten Schroeder, Petershagen (DE)

(73) Assignee: ABB Schweiz AG, Baden (CH)

( * ) Notice: Subject to any disclaimer, the term of this patent is extended or adjusted under 35 U.S.C. 154(b) by 329 days.

(21) Appl. No.: 18/479,918

(22) Filed: Oct. 3, 2023

(65) Prior Publication Data

US 2024/0118225 A1 Apr. 11, 2024

(30) Foreign Application Priority Data

Oct. 7, 2022 (EP) .................................... 22200297 \
Oct. 26, 2022 (EP) .................................... 22203907

(51) Int. Cl. \
*G01N 25/18* (2006.01)

(52) U.S. Cl. \
CPC .................................... *G01N 25/18* (2013.01)

(58) Field of Classification Search \
CPC ........ G01N 25/18; G01N 25/20; G01K 1/143; G01K 7/42; G01K 13/02; G01K 1/026 \
See application file for complete search history.

(56) References Cited

U.S. PATENT DOCUMENTS 9,689,790 B2 * 6/2017 Patankar ............ G05B 23/0221 \
2017/0219438 A1 8/2017 Hocker et al.

(Continued)

FOREIGN PATENT DOCUMENTS

CN 113091931 A 7/2021 \
EP 3537124 B1 1/2021

(Continued)

OTHER PUBLICATIONS

Gebhardt et al., "Non-invasive temperature measurement of turbulent flows of aqueous solutions and gases in pipes," *tm—Technisches Messen*, 87(9): 553-563 (Aug. 13, 2020).

(Continued)

*Primary Examiner* — John E Breene \
*Assistant Examiner* — Manuel Salvador Castellon, Jr. \
(74) *Attorney, Agent, or Firm* — Fitch Even Tabin & Flannery LLP

(57) ABSTRACT

Computer implemented method for determining boundary thermal resistance data (Rbl) of a boundary layer (15), comprising the following steps: obtaining first temperature data (T1) from a first temperature sensor (13), which is arranged at a first pipe section (S1); obtaining second temperature data (T2) from a second temperature sensor (14), which is arranged at a second pipe section (S2); wherein the first temperature sensor (13) and the second temperature sensor (14) are non-invasive temperature sensors; providing process condition data (P); determining boundary thermal resistance data (Rbl) of a boundary layer (15) of the fluid (11) next to an inner surface (16) of the wall of the pipe (12) based on the process condition data (P) and/or based on the first temperature data (T1) and/or the second temperature data (T2).

20 Claims, 9 Drawing Sheets

(56)     References Cited

U.S. PATENT DOCUMENTS

2019/0390990 A1 *  12/2019  Krywyj ..................... G01L 9/04
2020/0363018 A1 *  11/2020  Rud ....................... G01K 13/02
2020/0408580 A1 *  12/2020  Gebhardt .............. G01F 1/6884

FOREIGN PATENT DOCUMENTS

EP          4009022  A1    6/2022
EP          4063815  A1    9/2022
EP          4130694  A1    2/2023
EP          4163589  A1    4/2023
WO    WO 2019/063519  A1    4/2019
WO    WO 2020/035260  A1    2/2020

OTHER PUBLICATIONS

European Patent Office, Extended European Search Report in
European Patent Application No. 22203907.5, 10 pp. (Aug. 25,
2023).
European Patent Office, Office Action in European Patent Application No. 22203907.5, 5 pp. (Nov. 24, 2025).

* cited by examiner

COMPUTER IMPLEMENTED METHOD FOR PROVIDING TEMPERATURE DATA, A COMPUTER PRODUCT ELEMENT AND A SYSTEM

CROSS-REFERENCE TO RELATED APPLICATIONS

The instant application claims priority to European Patent Application Nos. 22200297.4, filed Oct. 7, 2022, and 22203907.5, filed Oct. 26, 2022, each of which is incorporated herein in its entirety by reference.

FIELD OF THE DISCLOSURE

The present disclosure relates to a computer implemented method for determining boundary thermal resistance data and for providing temperature data of a fluid flowing through a pipe, a system for providing temperature data of a fluid flowing through a pipe, and a respective computer program product.

BACKGROUND OF THE INVENTION

Determination of temperatures are important for the operation of facilities, as being one of the main control parameters for process control. Ensuring that temperature measurements of process media are accurate and repeatable is critical.

For determination of a temperature of a medium within a pipe/vessel, typically surface temperature sensors are placed at a surface of a wall of the pipe/vessel in order to measure the temperature of this surface, and respectively determine the temperature of the medium at the other side of the wall. Another traditional temperature measurement is achieved by introducing an invasive sensor, for example a thermowell, into the pipe such that a measurement is taken downstream.

Temperature is a vital parameter for the safe and efficient operation of process facilities. But merely measuring a temperature difference does not give certainty on the condition and is of little practical use, since there are many situations in reality where there are spatial inhomogeneities in the temperature field across and along the pipe/vessel. Existing state of the art invasive or non-invasive sensors will not capture these circumstances.

It has now become apparent that there is a further need to provide an improved method for providing determining boundary thermal resistance data and/or for providing temperature data of a fluid flowing through a pipe.

BRIEF SUMMARY OF THE INVENTION

In view of the above, the present disclosure describes an improved method for determining boundary thermal resistance data and/or providing temperature data of a fluid flowing through a pipe. It is in particular an object of the present invention to provide a method with a more accurate boundary layer resistance calculation, in which flow data may be determined.

According to a first aspect of the present disclosure, a computer implemented method for providing temperature data of a fluid flowing through a pipe is provided, comprising: obtaining first temperature data from a first temperature sensor, which is arranged at a first pipe section; obtaining second temperature data from a second temperature sensor, which is arranged at a second pipe section; wherein the first temperature sensor and the second temperature sensor are non-invasive temperature sensors; providing process condition data; determining boundary thermal resistance data of a boundary layer of the fluid next to an inner surface of the pipe wall of the pipe based on said process condition data and/or based on the first temperature data and/or the second temperature data; optionally, determining the temperature data of the fluid based on at least the first and/or second temperature data and the boundary thermal resistance data of the boundary layer.

In one embodiment, the first and second temperature sensors are arranged spatially offset. That means that the first and second temperature sensors are distanced from each other in a longitudinal and/or a circumferential direction. The first and second pipe sections describe the positions where the first and second temperature sensors are arranged.

BRIEF DESCRIPTION OF THE SEVERAL VIEWS OF THE DRAWING(S)

DETAILED DESCRIPTION OF THE INVENTION

Figure 1:
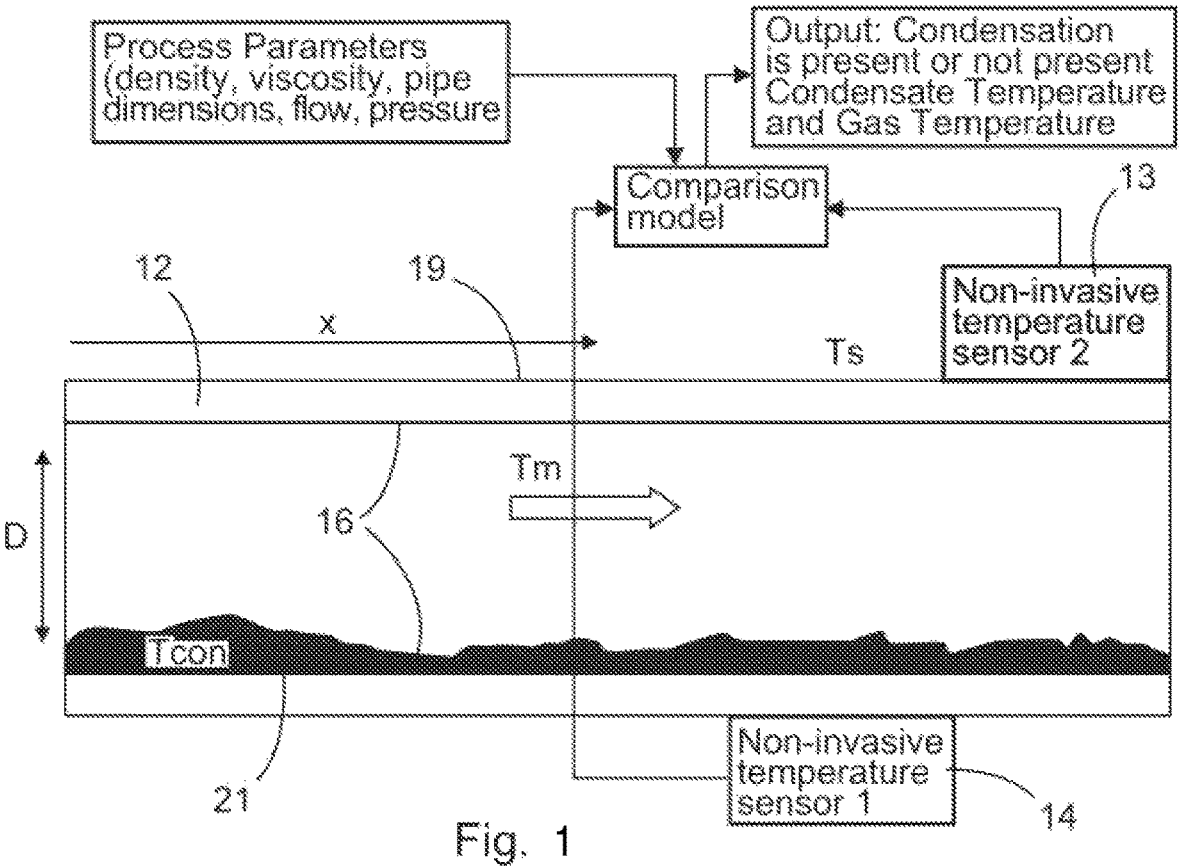
FIG. 1 is a schematic drawing of a longitudinal cut of a pipe comprising two non-invasive temperature sensors in accordance with the disclosure.

FIG. 1 shows a longitudinal cut of a pipe 12. The pipe 12 has a diameter D and a finite wall thickness. A fluid 11 flows through the pipe 12. The fluid 11 can be in liquid form or gaseous. Here, the fluid is gaseous. The direction of the flow of the fluid 11 is illustrated by arrows.

Figure 2:
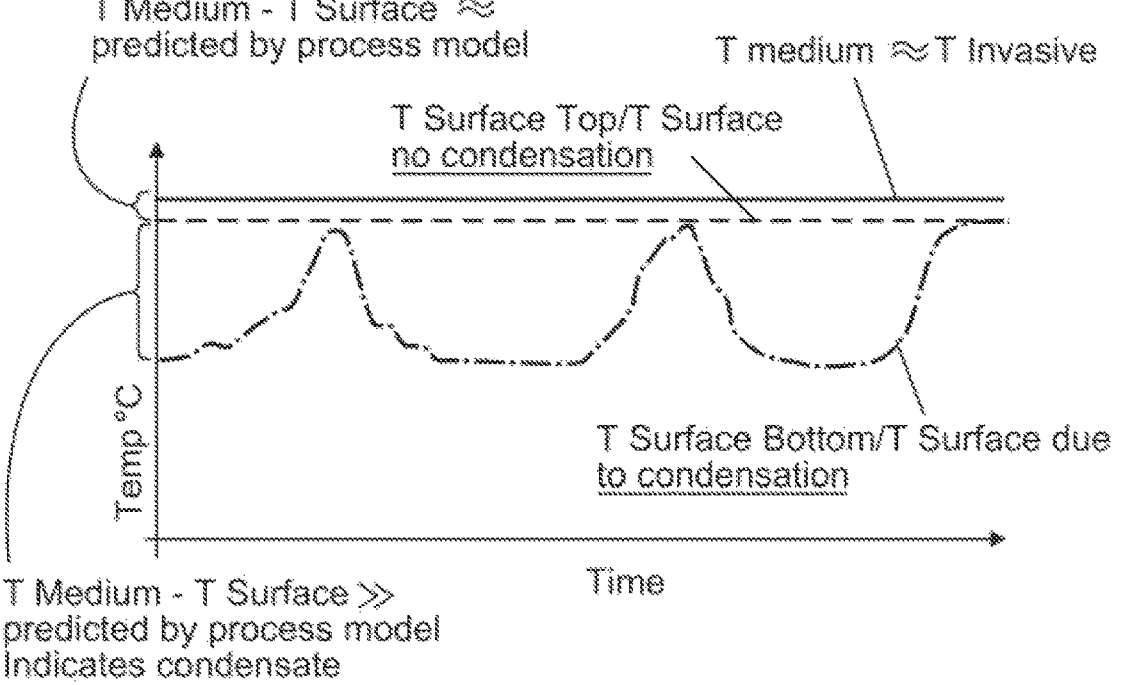
FIG. 2 is a schematic diagram of a comparison model in accordance with the disclosure.

In the embodiment of FIGS. 1 and 2, an embodiment with a first and second temperature sensor 13, 14 is shown. The first and second temperate sensor 13, 14 are both non-invasive. The two temperature sensors 13, 14 are positioned circumferentially opposite to each other or alternately positioned at a measured angle from a reference point.

The first temperature sensor 13 is arranged on a first pipe section S1 and the second temperature sensor 14 is arranged on a second pipe section S2. Both sensors are in direct contact with the pipe 12. The first and second pipe sections S1, S2 describe different sections of a surface of the pipe wall 19. The outer surface of the pipe wall 19 can comprise for example a mantel of the pipe 12 or an insulation arranged around the pipe 12.

In this embodiment, the two non-invasive sensors 13, 14 are positioned in such a way, that the fluid temperature Tm dominates the measurement of one of the temperature sensors 13, 14 (FIG. 2). Here the first temperature sensor 13 is dominated by the fluid temperature Tm and the second temperature sensor 14 is dominated by the condensate temperature Tcon.

In this embodiment, a nominal process temperature Tn (not shown) is used in the comparison model to determine the predicted surface temperature Tsp. The difference of the predicted temperature Tsp to the first temperature sensor 13 and the second temperature sensor 14 may be used to determine stratification and the temperature distribution.

The comparison model can be further improved for example by using the distance from the inlet and/or the radius R of curvature at a bend in the pipe 12 prior to the measurement point. Upstream flow disturbances can reduce stratification, so that the stratification will grow with the distance from the disturbances. Measuring this growth, for example by multiple sensor setups, can give additional flow data F and hence confirmation of any low-flow-stratification effect.

Figure 11:
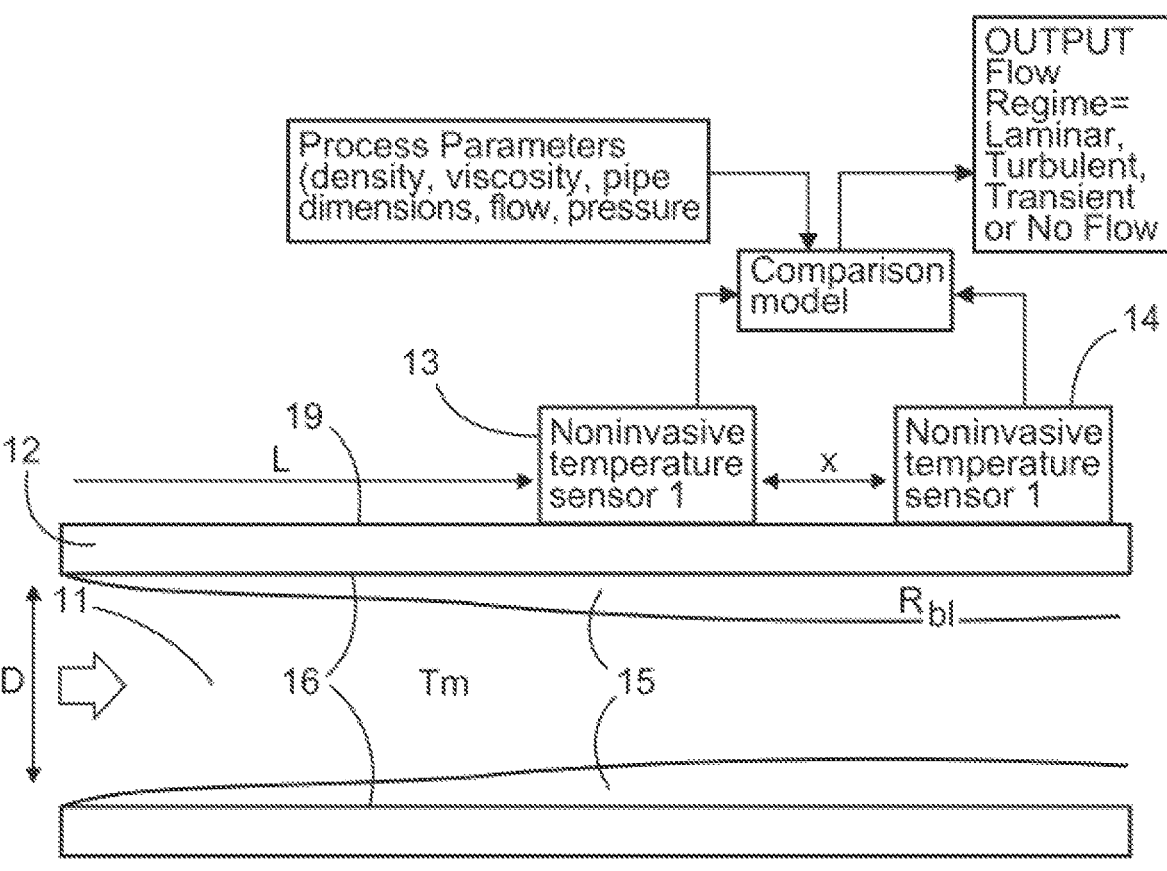
FIG. 11 is a schematic drawing of a longitudinal cut of a pipe comprising two non-invasive temperature sensors in accordance with the disclosure.

A boundary layer 15 is located on the inner pipe wall surface 16 of the pipe 12 (see for example FIG. 11). The boundary layer 15 is defined as the fluid layer close to the inner pipe wall surface 16. The boundary layer 15 is relatively slow compared to the mainstream of the fluid 11. The boundary layer 15 has a thermal boundary layer resistance Rbl. The thermal boundary layer resistance Rbl is part of a resistance network (cf. FIG. 4).

The resistance network connects a fluid temperature Tm with the surface temperature Ts of the outer surface of the pipe wall of the pipe 12.

FIG. 2 relates to FIG. 1 and graphically illustrates the difference between the normal flow of the gas without condensation and situations when condensate 21 occurs and data to support possible flow regimes. If the difference between the fluid temperature Tm and the surface temperature Ts deviates from the predicted temperature, condensate 21 accumulation can be suspected. In the same way as condensates, of course also solidification, crystallization or other types of build-ups can be detected since they will create a modified thermal boundary layer resistance Rbl.

Figures 3, 4:
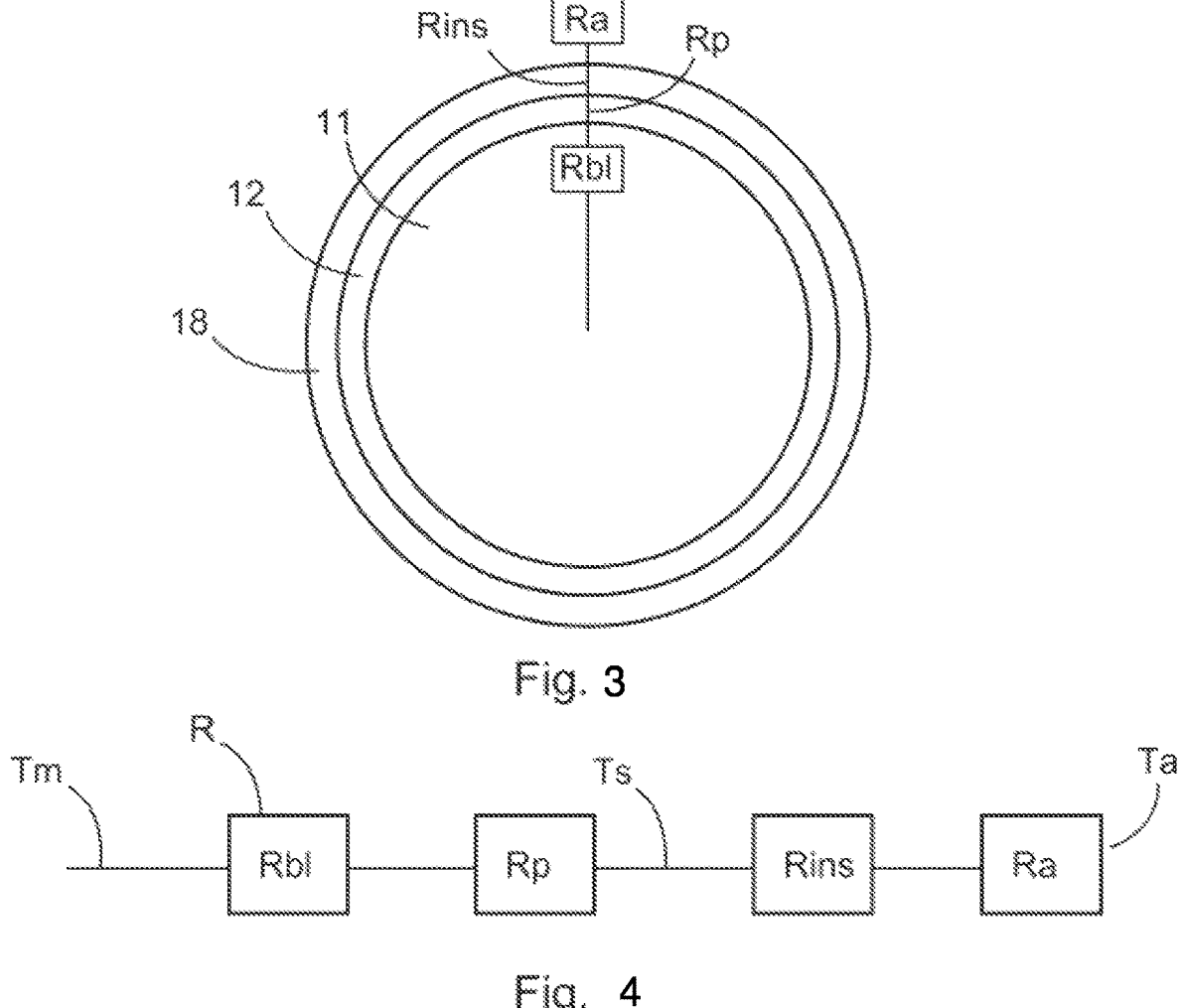
FIG. 3 is a schematic drawing of a resistance network in a cross section of a pipe in accordance with the disclosure.
FIG. 4 is a schematic drawing of a resistance network of a pipe in accordance with the disclosure.

FIG. 3 shows a cross section of a pipe 12. FIG. 3 shows components of the resistance network connecting the fluid temperature Tm and a surface temperature Ts.

FIG. 4 is a schematic view of the resistance network. The resistance network comprises the pipe thermal resistance Rp and the external resistance Ra, which depends on outside conditions. The pipe 12 may be also covered with an insulation 18 (cf. FIG. 3). Then, an additional insulation resistance Rins is added to the resistance network.

The fluid temperature Tm, which is the volume or mass average temperature of the fluid 11 is estimated by relating the surface temperature Ts to the fluid temperature Tm, via the thermal resistance network. The surface temperature Ts of the pipe 12 for a given process condition data P is dependent on thermal resistance Rbl of the boundary layer 15.

The process condition data P comprises physical data regarding the fluid and pipe parameters for determining the thermal boundary resistance Rbl. For example, nominal flow rate, pressure, density, viscosity, pipe dimensions, wall thickness and thermal conductivity.

Ts is provided by the first temperature sensor 13. Ts corresponds to the first temperature data T1. Ta is an external temperature. Ta is a reference temperature and can be measured by third sensor (not shown) or can be input into the model.

The method derives a value for the boundary layer resistance Rbl process conditions P. The boundary layer resistance Rbl is by one embodiment expressed as a function of the Reynolds number Re and the Prandtl number Pr which characterize the flow/thermal condition of the fluid. Several situations can lead to variation in boundary layer resistance Rbl without knowledge of the processing software and cause a measurement error. Factors which cause variation in boundary layer resistance, are changing flowrates or flow regimes laminar, transitional, and turbulent regimes, distance of the measurement location from the pipe inlet, upstream flow distorting features like bends, and occurrence of natural convection or buoyancy.

Figure 5A:
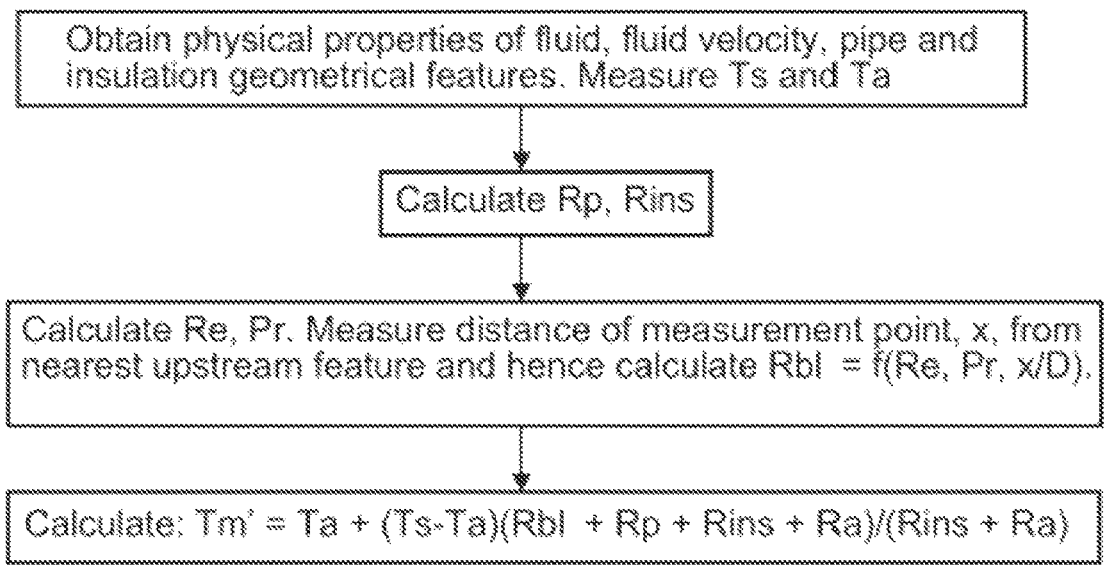
FIG. 5a is a flowchart for a method embodiment in accordance with the disclosure.
Figure 5B:
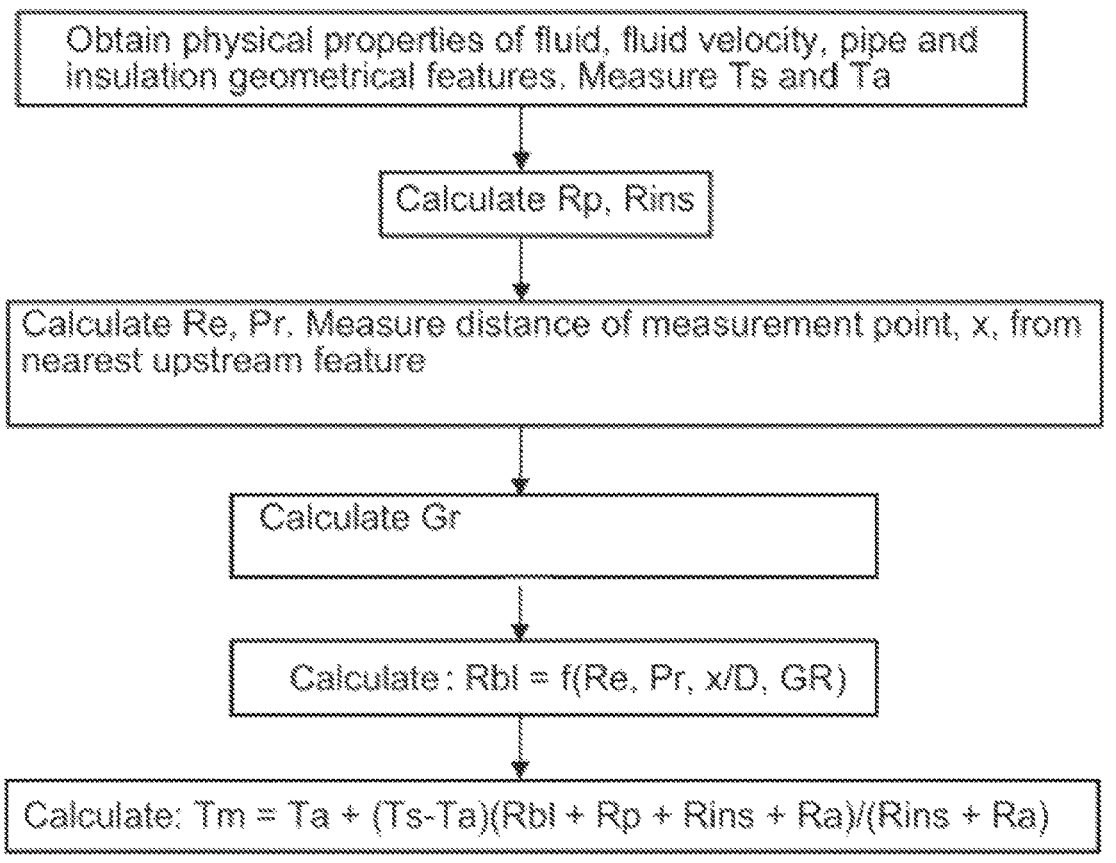
FIG. 5b is a flowchart for an alternative embodiment of a method in accordance with the disclosure.

The calculation of the boundary layer resistance Rbl and the fluid temperature Tm are explained on the basis of examples shown in FIGS. 5a and 5b.

In FIGS. 5a and 5b, to estimate the fluid temperature Tm, the surface temperature Ts is measured by the first and/or second temperature sensor 13, 14 and needs to be related to the fluid temperature Tm via the resistance network. The boundary layer 15 provides the thermal boundary resistance Rbl to transfer heat from the fluid 11 to the wall. The thermal boundary resistance Rbl needs to be accurately calculated to ensure accuracy of non-invasive temperature measurement.

At first, physical properties of the fluid are obtained. Such properties are for example fluid velocity data and pipe and/or insulation geometry data, in particular pipe diameter D. Additionally the surface temperature Ts and the external temperature Ta are measured. The surface temperature Ts can be measured for example by the first temperature sensor 13 and corresponds to the first temperature data T1.

With data based on the geometry of the pipe 12, the pipe thermal resistance Rp is calculated and, if necessary, insulation resistance Rins too.

In the next step, the Reynolds number Re and the Prandtl number Pr are calculated with the obtained data and the distance x from a nearest upstream feature to the first and/or second temperature sensor 13, 14 is measured. With this data, a boundary layer resistance Rbl can be calculated.

$$Rbl=f(Re,Pr,x/D) \qquad \text{Eq. 1}$$

The boundary layer resistance Rbl allows to calculate the temperature of the fluid Tm (see FIG. 5a).

$$(Tm-Ta)/(Ts-Ta)=(Rbl+Rp+Rins+Ra)/(Rins+Ra) \qquad \text{Eq. 2}$$

The external resistance Ra, varies often between 2 and 6 W/m2·K (for typical insulations 18 or uninsulated pipes 12). Therefore, the external resistance Ra does not impact the temperature measurement significantly, for insulated pipes 12. The insulation resistance Rins is calculated by using the insulation dimensions and thermal conductivity of the insulation 18.

Calculation of the boundary layer resistance Rbl involves calculation of the Reynolds number Re which requires fluid velocity data, density data, viscosity data and pipe diameter data. Fluid velocity data is preferably obtained by measuring. Density and viscosity data are either measured or obtained from knowledge of the fluid 11. The Reynolds number Re is given as:

$$\text{(density*velocity*pipe diameter)/dynamic viscosity} \qquad \text{Eq. 3}$$

The Calculation of the boundary layer resistance Rbl also requires the Prandtl number Pr. Calculation of the Prandtl number Pr requires the physical properties of the fluid, the thermal conductivity, the specific heat capacity and the viscosity data, often influenced as such by local temperature. The Prandtl number Pr is given by:

$$\text{(dynamic viscosity*specific heat capacity)/thermal conductivity} \qquad \text{Eq. 4}$$

The boundary layer resistance Rbl also possibly includes the Grashof number Gr or any number which accounts for natural convection or buoyancy effects leading to flow/thermal stratification across the transverse pipe cross section (see FIG. 5*b*).

The Grashof number Gr is calculated based on the fluid properties.

$$Rbl=f(Re,Pr,x/D,Gr) \qquad \text{Eq. 5}$$

Figure 6:
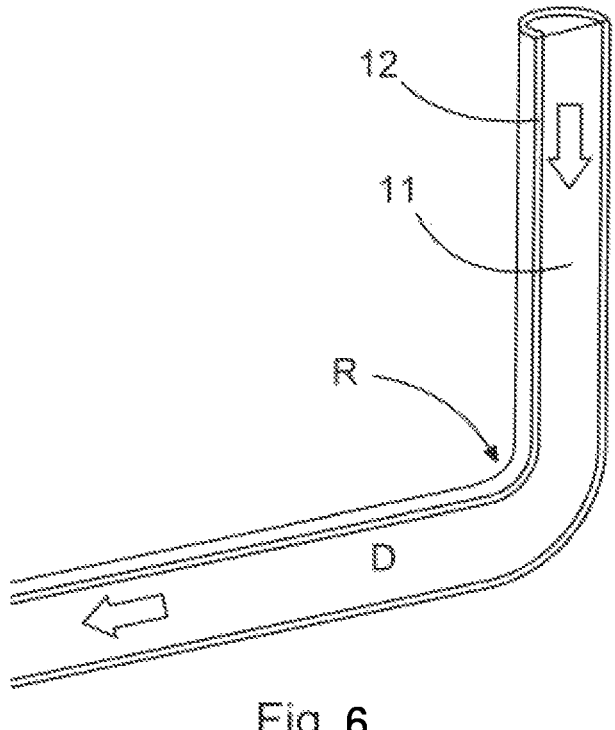
FIG. 6 is a schematic drawing of a longitudinal cut of a pipe with a curvature in accordance with the disclosure.

FIG. 6, shows a pipe 12 with an upstream curvature with a radius R. The pipe 12 has the diameter D.

Figure 7:
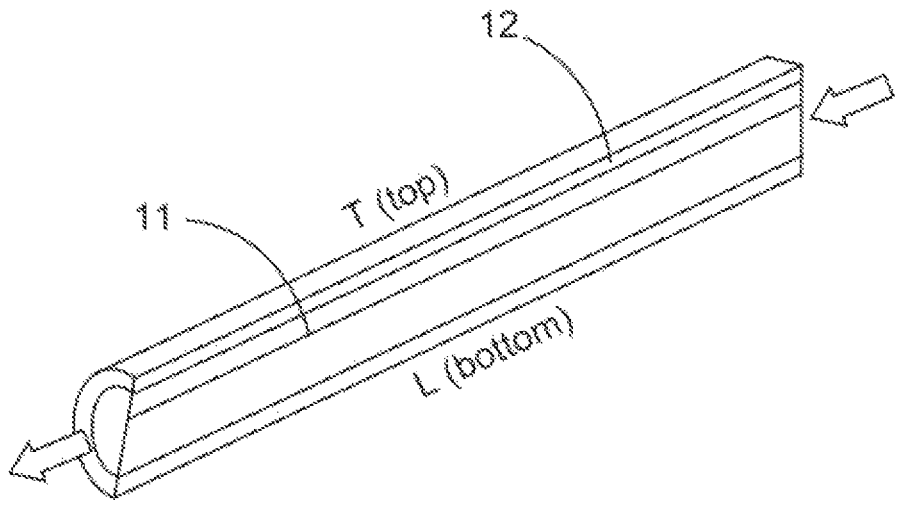
FIG. 7 is a schematic drawing of a longitudinal cut of a pipe in accordance with the disclosure.

FIG. 7 shows a longitudinal section of the pipe 12. The pipe 12 comprises a top and bottom section.

Figure 8:
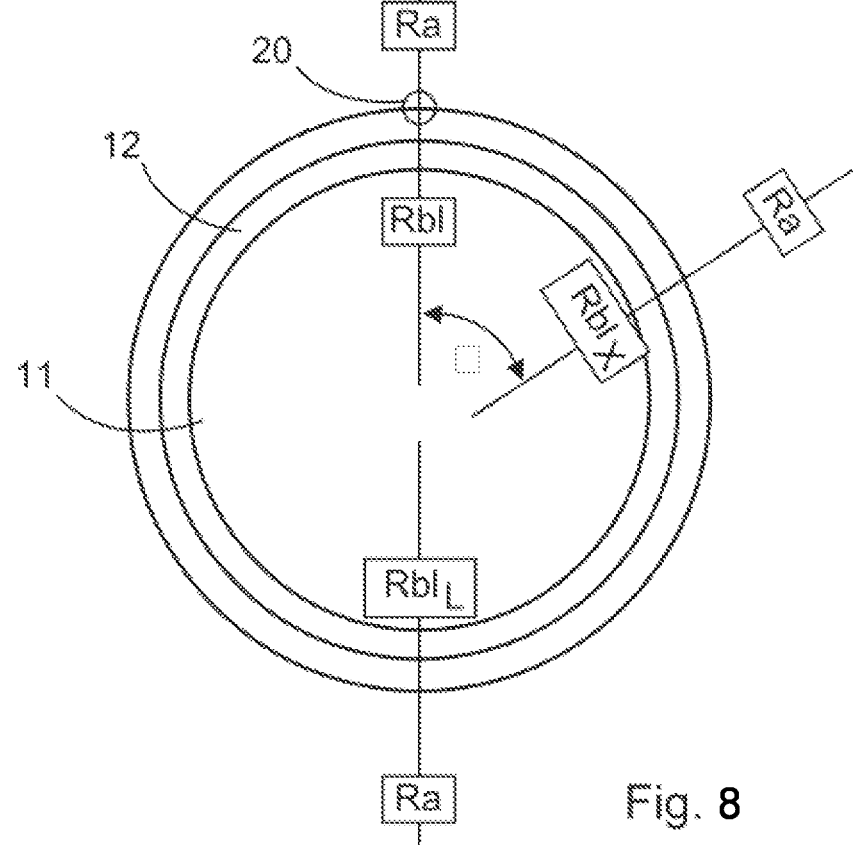
FIG. 8 is a schematic drawing of a cross section of a pipe, illustrating a resistance network, in accordance with the disclosure.
Figure 9:
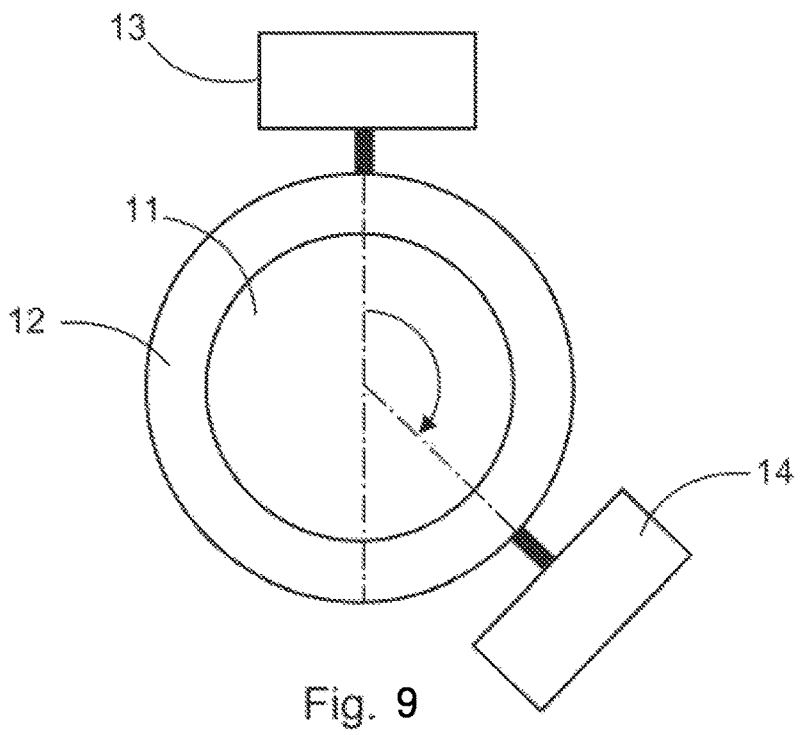
FIG. 9 is a schematic drawing of a cross section of a pipe comprising two non-invasive temperature sensors in accordance with the disclosure.
Figure 10:
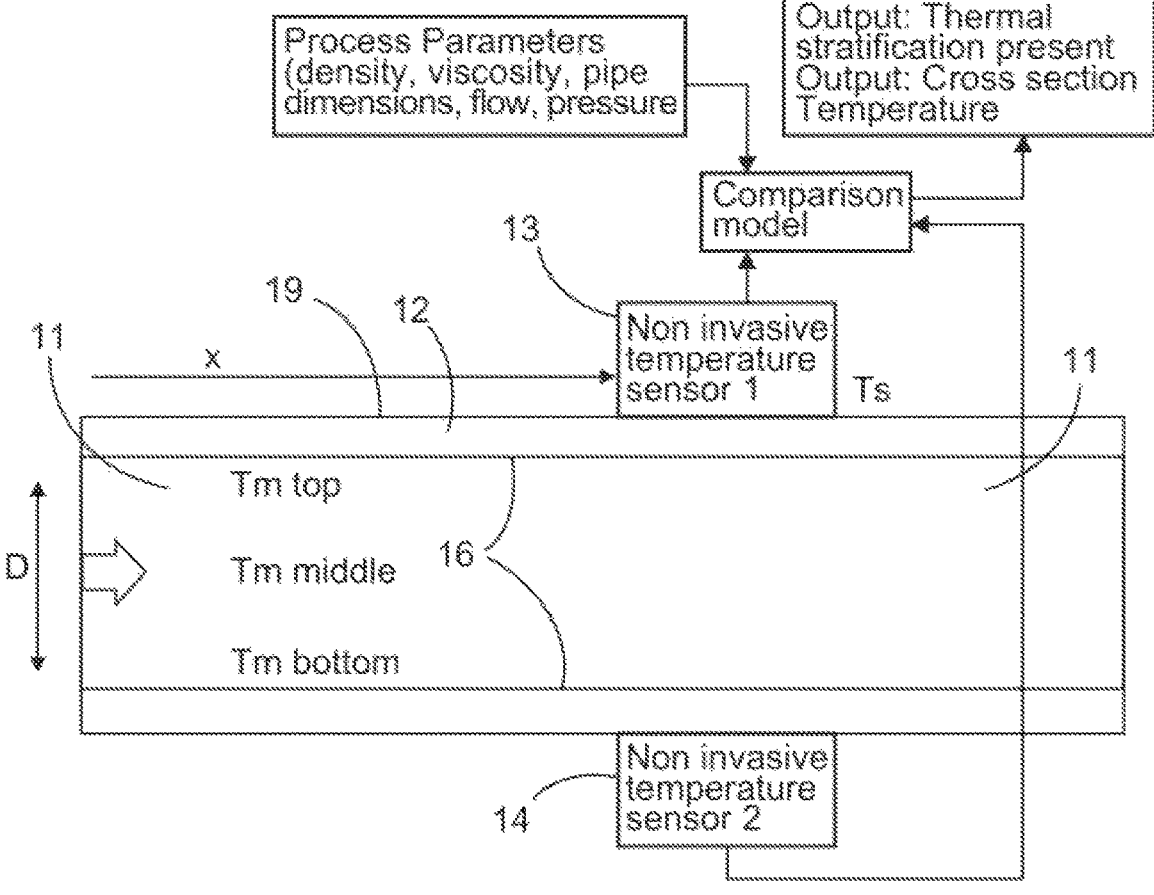
FIG. 10 is a schematic drawing of a longitudinal cut of a pipe comprising two non-invasive temperature sensors in accordance with the disclosure.

FIG. 8 shows a cross section of the pipe 12 according to FIG. 7. The boundary layer resistance Rbl in this embodiment includes a parameter accounting for circumferential variation in fluid/thermal conditions due to natural convection or buoyancy effects. Such a parameter is provided by the process condition data P. Here, a reference point 20 is set, so the boundary layer resistance Rbl at any circumferential location can be expressed in terms of an angle and incorporated into the method.

$$Rbl=f(Re,Pr,x/D,Gr,D/2R,\varphi) \qquad \text{Eq. 6}$$

The dependency of boundary layer resistance Rbl on $\varphi$ can be, for example, determined by a computational fluid dynamics calculation.

The presence or probability of a stratification can be output in the form of an alarm. The temperature distribution across the pipe 12 is provided as an output using several variables for lower, middle, and top temperature. To re-iterate, the model ensures that the process condition data (Nominal flow rate, pressure, density, viscosity, pipe dimensions, wall thickness and thermal conductivity of the fluid) are either input as stationary nominal parameters or even as inputs from real sensors in the vicinity and are taken into consideration.

Figure 12:
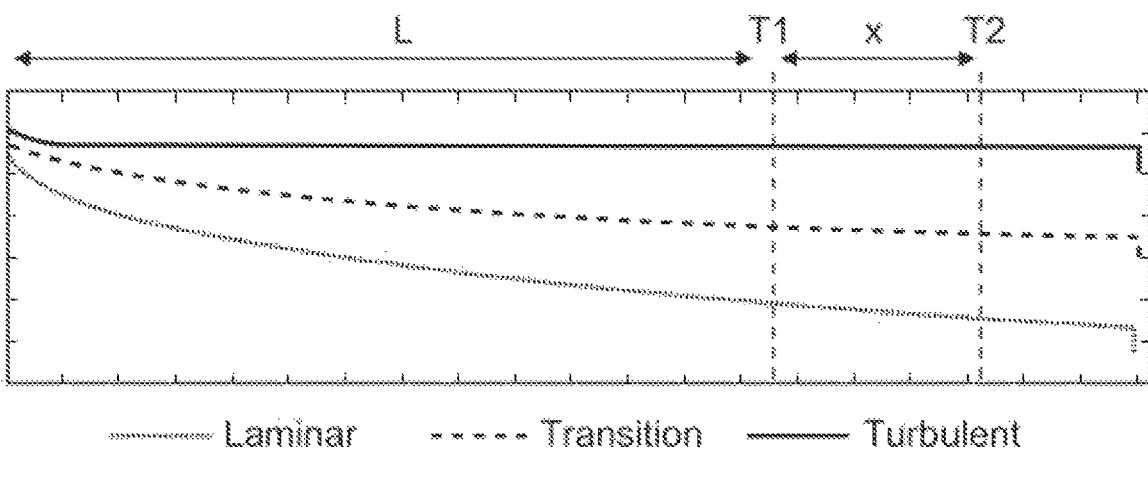
FIG. 12 is a diagram regarding the dependence between temperature and flow regime in accordance with the disclosure.
Figure 13:
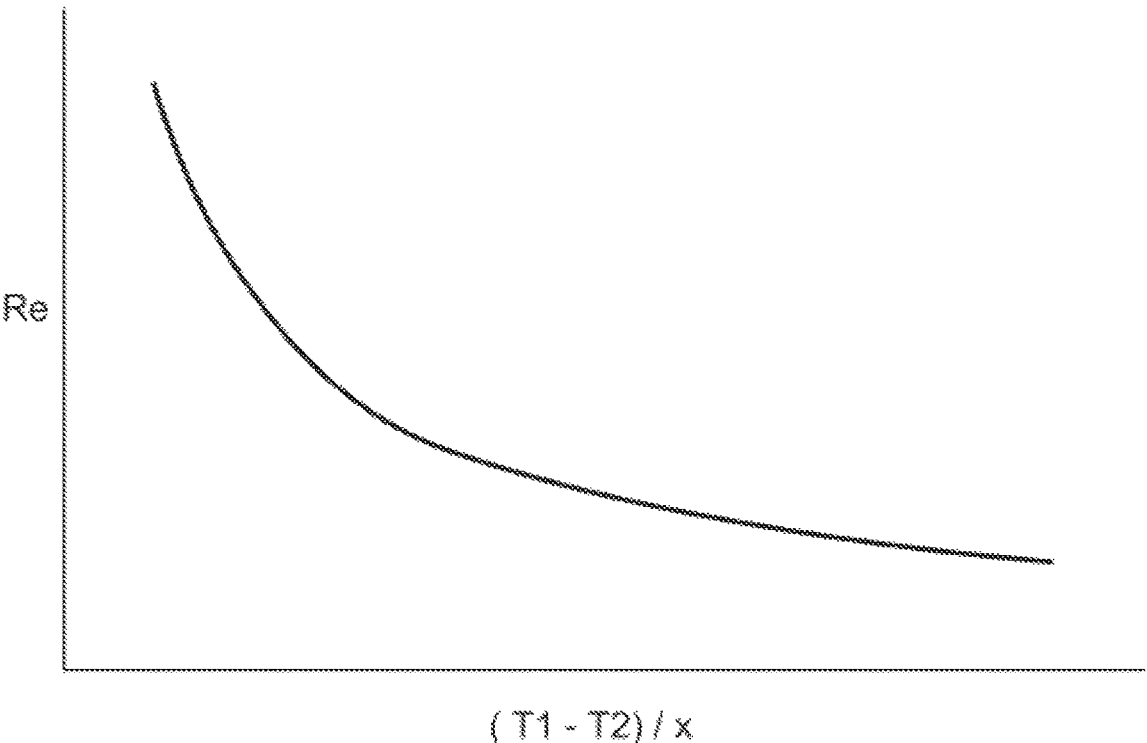
FIG. 13 is a diagram regarding the correlation between temperature and Reynolds number in accordance with the disclosure.

In FIG. 11, an alternate embodiment to determine flow regimes is shown which includes the use of two surface sensors mounted with a specified distance between them and a specified distance x from the inlet of an essentially straight pipe section. The difference between the first and second temperature data T1 and T2 or ΔT divided by the distance separating the measurement points is dependent on the flow data F (laminar, transitional or turbulent) and hence can be correlated to the Reynolds number Re as shown in FIGS. 12 and 13.

The correlation can be obtained by testing or computational/analytical methods. Based on the correlation, the correct Reynolds number Re can be imposed in the boundary layer resistance Rbl.

If stratification is not expected, e.g., for high-viscous fluids or for essentially vertical pipes, one surface sensor per perimeter is sufficient. On the other hand: If laminar behavior is assumed, e.g., from an (in axial direction) significantly changing boundary layer conductivity, together with other circumstances like low viscosity and/or an essentially non-vertical pipe, a warning message can be issued that Temperature inhomogeneities are expected.

The method requires no online flow measurement. If a flow is measured, the fluid viscosity can be calculated from the Reynolds number obtained from the relation shown in FIGS. 12 and 13.

In FIGS. 12 and 13, first and second temperature data or pipe surface temperatures T1 and T2 are measured by the first and second temperature sensors 13, 14 at points separated by distance x. Corresponding to first and second temperature data T1-T2 or ΔT the Reynolds number Re is obtained from the relation between Re and ΔT. The boundary layer resistance Rbl is modified accordingly, and the fluid temperature Tm calculated using equation 2.

Figure 14:
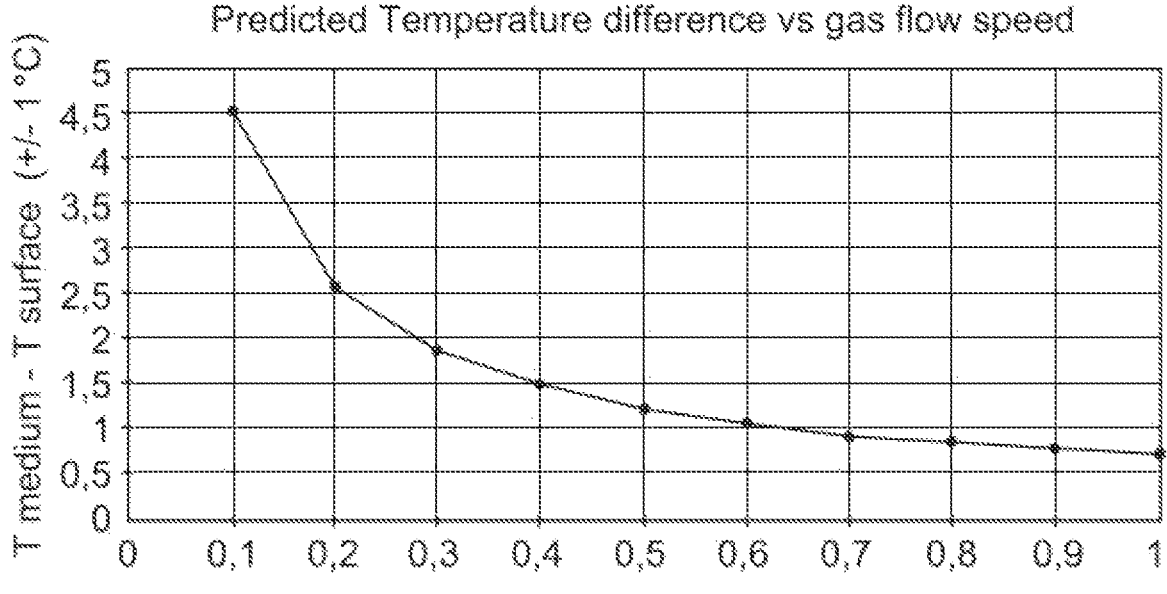
FIG. 14 is a diagram regarding a predicted temperature difference and the fluid velocity in accordance with the disclosure.

FIG. 14 shows the relation between a predicted temperature difference and a flow speed of the fluid, in particular a gas. The difference decreases with a growing flow speed.

In an alternate embodiment, the ambient temperature can be controlled so as to ensure a significant temperature difference between the fluid 11 and the ambient. Preferably, the measurement of the surface temperature Ts should be as accurate as possible. This is possible with reasonably insulated and carefully installed cable thermometers. Also, temperatures should not be higher than approximately 100° C.

The present disclosure has been described in conjunction with exemplary preferred embodiments. However, other variations can be understood and effected by those persons skilled in the art and practicing the claimed invention, from the studies of the drawings, this disclosure, and the claims. Notably, in particular, the any steps presented can be performed in any order, i.e., the present invention is not limited to a specific order of these steps. Moreover, it is also not required that the different steps are performed at a certain place or at one node of a distributed system, i.e., each of the steps may be performed at different nodes using different equipment/data processing units.

In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

REFERENCE SIGNS

S1 first pipe section
S2 second pipe section
Tm fluid temperature data
T1 first temperature data
T2 second temperature data
Ts surface temperature
Tsp predicted surface temperature
Tcon condensate temperature
P process condition data Rbl thermal boundary resistance data
Rp pipe resistance
Rins insulation resistance
Ra external resistance
10 system
11 fluid
12 pipe
13 first temperature sensor
14 second temperature sensor
15 boundary layer
16 inner surface of the pipe wall
18 insulation
19 outer surface of the pipe wall
20 reference point
21 condensate According to a first aspect of the present disclosure, a computer implemented method for providing temperature data of a fluid flowing through a pipe is provided, comprising: obtaining first temperature data from a first temperature sensor, which is arranged at a first pipe section; obtaining second temperature data from a second temperature sensor, which is arranged at a second pipe section; wherein the first temperature sensor and the second temperature sensor are non-invasive temperature sensors; providing process condition data; determining boundary thermal resistance data of a boundary layer of the fluid next to an inner surface of the pipe wall of the pipe based on said process condition data and/or based on the first temperature data and/or the second temperature data.

Optionally, the method further includes determining the temperature data of the fluid based on at least the first and/or second temperature data and the boundary thermal resistance data of the boundary layer. The first and second temperature sensors are arranged spatially offset. That means the first and second temperature sensors are distanced from each other in a longitudinal and/or a circumferential direction. The first and second pipe sections describe the positions where the first and second temperature sensors are arranged.

Additionally, an ambient temperature may be provided or measured by a third temperature sensor. By taking the ambient or environmental temperature into consideration, a better measurement may be achieved.

The first and second temperature sensor are arranged at an outside surface of the pipe wall. The outer surface of the pipe wall may comprise an insulation material which is arranged around the pipe. Moreover, the packaged non-invasive sensors may e.g., be put in contact with the outside pipe surface. If the surface is painted the paint layer may be removed in a beneficial embodiment.

The two non-invasive sensors may be positioned circumferentially opposite to each other or alternately may be positioned at a measured angle from a reference point. A nominal process temperature may be used as an input into the comparison model to predict an expected surface temperature at the mounting points of the surface sensors. A difference from the prediction can be used to determine both the presence of stratification and the temperature distribution as described above.

The first and second temperature data may comprise data of the surface temperature of the pipe. The type of data provided depends on the used sensor type. Embodiments regarding these possible configurations are discussed below.

The boundary layer can be described as the layer of the fluid, which is next to the inner surface of the wall. The stream of the boundary layer is relatively slow compared to the mainstream fluid. This layer has its own thermal resistance and contributes to the difference in temperature between the bulk temperature of the flowing fluid and the wall temperature.

Accuracy of measurement depends especially on a correct estimation of the boundary layer resistance. The boundary layer resistance is the thermal resistance of the fluid layer next to the inner surface of the pipe wall of the pipe and is an important component in the overall thermal resistance network connecting the surface temperature and the fluid temperature. Variation in boundary layer resistance, due to flow regime changes, distance of measurement point from the pipe inlet, upstream flow distorting features and natural convection or buoyancy effects causes drifts in the measured temperature.

The method comprises a prediction and/or comparison model, wherein a surface temperature may be predicted and compared to a measured surface temperature. Alternatively, or additionally, the predicted surface temperature may be based on a nominal temperature as reference. A difference from the prediction can be used to determine both the presence of stratification and the temperature distribution.

The process condition data can comprise nominal process conditions. The process condition data comprises data necessary for calculating or estimating the thermal resistance of the boundary layer and subsequently the temperature of the fluid inside the pipe. The process condition data is also used to determine flow data. The process condition data can be input manually or provided by further sensors. It is also possible that corresponding calculations are carried out offline.

A possible embodiment comprises determining flow data of the fluid based on a comparison model using the first and second temperature data and the process condition data.

The flow data can include flow state data and/or a flow regime data and/or stratification data and/or flow allocation data. Flow state data comprises information whether a stratification is present. Flow regime data comprises information if the flow is turbulent transitional or laminar. Flow allocation data indicates if there are any build-ups or allocations inside the pipe, for example crystallization and condensation build-ups. Flow data also includes if there is any concentration of product constituents.

According to a further embodiment, the process condition data comprise distance data of the first temperature sensor and/or the second temperature sensor to a reference point, in particular to a feature of the pipe. Such a feature can be an inlet or a bending of the pipe.

According to another embodiment, the process condition data comprise flow velocity data, viscosity data, density data and pipe diameter data. With this data, the Reynolds number may be calculated. The Reynolds number helps predicting flow patterns in different fluid flow situations.

According to a further embodiment, the process condition data comprise viscosity data, thermal conductivity data and specific heat capacity data of the fluid. Based on these data the Prandtl number may be calculated. The Prandtl number is defined as the ratio of momentum diffusivity to thermal diffusivity.

The Reynolds number, the Prandtl number and the distance data of the temperature sensors are advantageous to determine or estimate a precise value of the thermal resistance of the boundary layer. In other words, the thermal resistance of the boundary layer depends at least on the Reynolds number, the Prandtl number and the distance of the temperature sensor to a reference point.

In another embodiment, the process condition data comprise curvature radius data and diameter data of the pipe. A bend with a curvature with a radius R is a flow disturbance and the curvature data is therefore advantageous for determining flow data. The curvature data and the diameter data are also further factors for determining a precise value of the resistance of the boundary layer.

According to an embodiment, the process condition data comprise pressure data and/or the pipe material data and/or wall thickness data. These data help to estimate a more precise value for the resistance of the boundary layer. These data can be measured or input manually.

According to an embodiment, a thermal resistance network is determined; wherein the thermal resistance network comprises external thermal resistance data, insulation thermal resistance data, pipe thermal resistance data and the boundary thermal resistance data. The boundary thermal resistance is preferably estimated according to one of the methods above. The remaining resistances are for example measured, known, or calculated.

In a possible embodiment, the first and the second temperature sensors are circumferentially offset by an angle with respect to a reference point, wherein a nominal temperature is used to predict the surface temperature and a difference of the predicted surface temperature, and the measured surface temperature based on the first temperature sensor and/or the second temperature sensor is used to determine stratification and/or temperature distribution.

For example, the embodiment can utilize two non-invasive sensors that are positioned circumferentially opposite to each other or alternately positioned at a measured angle from a reference point. In these cases, the nominal temperature or nominal process temperature is used as an input in the comparison model to predict the expected surface temperature at the mounting points of the surface sensors. A difference from the prediction can be used to determine both the presence of stratification and the temperature distribution as described above. In all these cases, the detection of the situation with the process model can be strengthened by inputting the distance from the inlet or the radius of curvature at a bend in the piping prior to the measurement point as described in the previous embodiments. The reason is that upstream flow disturbances can reduce stratification, so that it will depend on, and grow with, the distance from the disturbances. Measuring this growth, e.g. by once or multiply repeating the setups which are described in this embodiment, can give additional confirmation of the low-flow-stratification effect.

In an embodiment, the first and second temperature sensor are arranged on the pipe with a specified distance from each other; wherein the flow regime is determined by the difference of the first temperature data and the second temperature data divided by the distance.

In this embodiment, for example, two surface temperature sensors are mounted with a specified distance between each other and a specified distance from the inlet of an essentially straight pipe section. The difference between the first and second temperature data divided by the distance separating the measurement points is dependent on the flow regime (laminar, transitional, or turbulent) and hence can be correlated to the Reynolds number. The correlation can be obtained by testing or computational/analytical methods. If stratification is not expected, e.g., for high-viscous fluids or for essentially or sufficiently vertical pipes, one surface sensor per perimeter will be sufficient. On the other hand: If laminar behavior can be assumed, e.g., from an (in axial direction) significantly changing boundary layer conductivity, together with other circumstances like low viscosity and/or an essentially non-vertical pipe, a warning message can be issued that temperature inhomogeneities are expected.

An aspect of the invention comprises a computer program product, which, when executed on computing devices of a computing environment, is configured to carry out the steps of the method according to one of the above embodiments.

Another aspect of the invention comprises a system for providing temperature data of a fluid flowing through a pipe, the system comprising: a first temperature sensor for providing first temperature data, which is thermally coupled to a first pipe section; a second temperature sensor for providing second temperature data, which is thermally coupled to a second pipe section; wherein the first and second temperature sensors are non-invasive temperature sensors; wherein the system comprises a processing unit configured to determine the temperature data of the fluid on the basis of at least the first and/or second temperature data and the boundary thermal resistance data of the boundary layer; and to determine flow data of the fluid based a comparison model using at least the first and second temperature data and the process condition data.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer implemented method for determining boundary thermal resistance data of a boundary layer, comprising:

obtaining first temperature data from a first temperature sensor, the first temperature sensor being arranged at a first pipe section;

obtaining second temperature data from a second temperature sensor, the second temperature sensor being arranged at a second pipe section;

wherein the first temperature sensor and the second temperature sensor are non-invasive temperature sensors;

providing process condition data; and determining boundary thermal resistance data of a boundary layer of fluid adjacent to an inner surface of a wall of the pipe based on at least one of: the process condition data, the first temperature data, and the second temperature data.

2. The computer implemented method according to claim 1, wherein determining the temperature data of the fluid is based on at least one of the first and/or second temperature data, and is further based on boundary thermal resistance data of the boundary layer.

3. The computer implemented method according to claim 1, wherein determining flow data of the fluid is based on a comparison model using the first and second temperature data and the process condition data.

4. The computer implemented method according to claim 3, wherein the flow data comprises at least one of: flow state data, flow regime data, stratification data, and allocation data.

5. The computer implemented method according to claim 1, wherein the process condition data comprises distance data of the first temperature sensor and/or second temperature sensor to a reference point of the pipe, the reference point of the pipe including a feature of the pipe.

6. The computer implemented method according to claim 1, wherein the process condition data comprises flow velocity data, viscosity data and density data of the fluid, and pipe diameter data.

7. The computer implemented method according to claim 1, wherein the process condition data comprises viscosity data, thermal conductivity data and specific heat capacity data of the fluid.

8. The computer implemented method according to claim 1, wherein the process condition data comprises curvature radius data and diameter data of the pipe.

9. The computer implemented method according claim 1, wherein the process condition data comprises at least one of: pressure data, pipe material data, and wall thickness data.

10. The computer implemented method according to claim 1, further comprising determining a thermal resistance network; wherein the thermal resistance network comprises external thermal resistance data, insulation thermal resistance data, pipe thermal resistance data and boundary thermal resistance data.

11. The computer implemented method according to claim 1, wherein the first and second temperature sensors are circumferentially offset by an angle with respect to a reference point; and wherein a nominal temperature is used to predict the surface temperature and a difference from the predicted surface temperature and measured surface temperature, and wherein the difference is based on the first temperature sensor and/or the second temperature sensor that is used to determine stratification and/or temperature distribution.

12. The computer implemented method according to claim 1, wherein the first and second temperature sensors are arranged on the pipe with a specified distance from each other; and wherein a flow regime of the fluid is determined by the difference of the first temperature data and the second temperature data divided by the specified distance.

13. A system for providing temperature data of a fluid flowing through a pipe, the system comprising:

a first temperature sensor configured for providing first temperature data, the first temperature sensor disposed in a thermal coupling relation to a first pipe section;

a second temperature sensor configured for providing second temperature data, the second temperature sensor disposed in a thermal coupling relation to a second pipe section;

wherein each of the first temperature sensor and the second temperature sensor is a non-invasive temperature sensor; and a processing unit configured to:

determine the temperature data of the fluid based on at least one of the first temperature data and the second temperature data, and additionally based on boundary thermal resistance data of a boundary layer;

determine flow data of the fluid based on a comparison model using the first and second temperature data and process condition data; and determine the boundary thermal resistance data of the boundary layer according to a method comprising the following steps:

obtaining the first temperature data from the first temperature sensor, which is arranged at the first pipe section;

obtaining the second temperature data from the second temperature sensor, which is arranged at the second pipe section;

providing process condition data;

determining the boundary thermal resistance data of the boundary layer of the fluid next to an inner surface of a wall of the pipe based on any of:

the process condition data;

the first temperature data; and the second temperature data.

14. The system according to claim 13, wherein the processing unit is further configured to determine flow data of the fluid based on a comparison model using the first and second temperature data and the process condition data.

15. The system according to claim 13, wherein determining flow data of the fluid is based on a comparison model using the first and second temperature data and the process condition data.

16. The system according to claim 13, wherein the flow data comprises at least one of: flow state data, flow regime data, stratification data, and allocation data.

17. The system according to claim 13, wherein the process condition data comprises distance data of the first temperature sensor and/or second temperature sensor to a reference point of the pipe, the reference point of the pipe including a feature of the pipe.

18. The system according to claim 13, wherein the process condition data comprises flow velocity data, viscosity data and density data of the fluid, and pipe diameter data.

19. The system according to claim 13, wherein the process condition data comprises viscosity data, thermal conductivity data and specific heat capacity data of the fluid.

20. The system according to claim 13, wherein the process condition data comprises curvature radius data and diameter data of the pipe.

\* \* \* \* \*